Jan. 5, 1926.  1,568,371
J. D. FESTARY
ENDLESS TRACTION TREAD
Filed Jan. 19, 1925   2 Sheets-Sheet 2
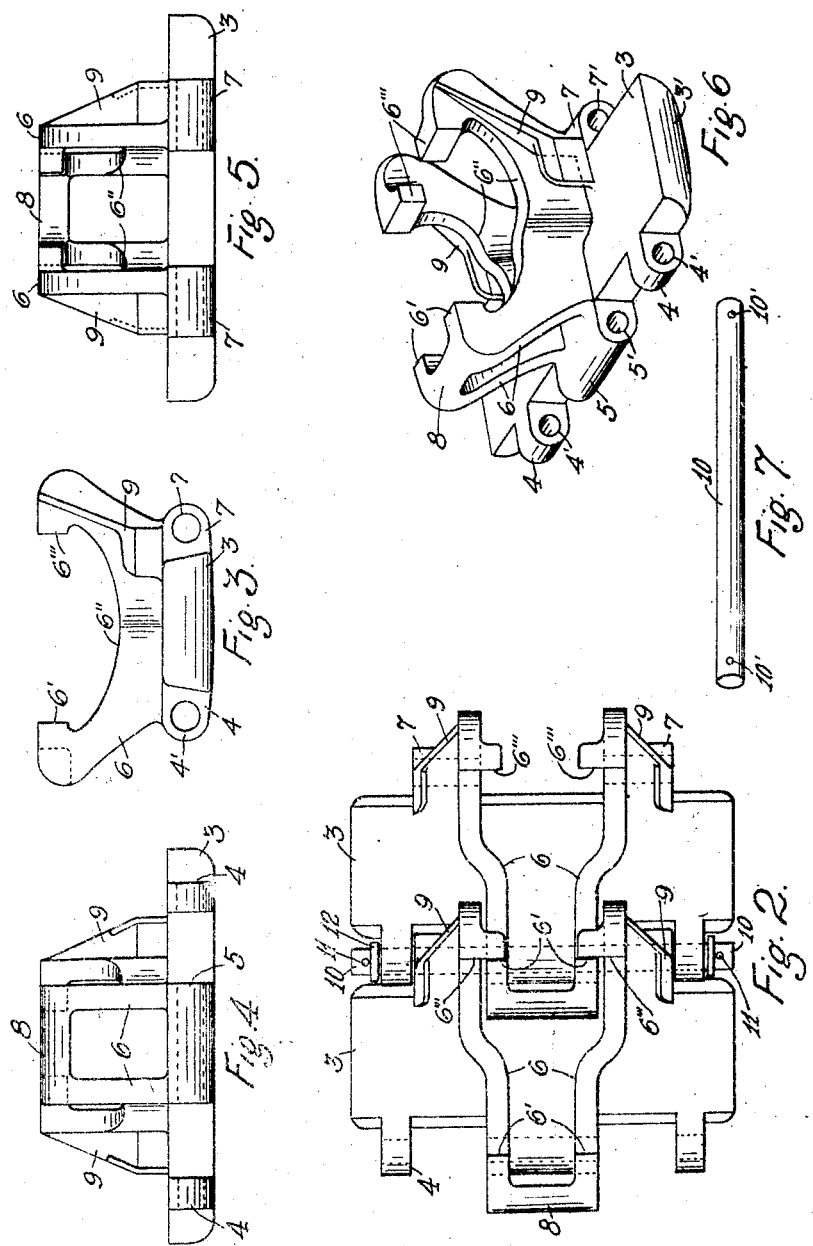
INVENTOR.
J. D. Festary
BY
Langner, Parry, Card, & Langner
ATTORNEYS.

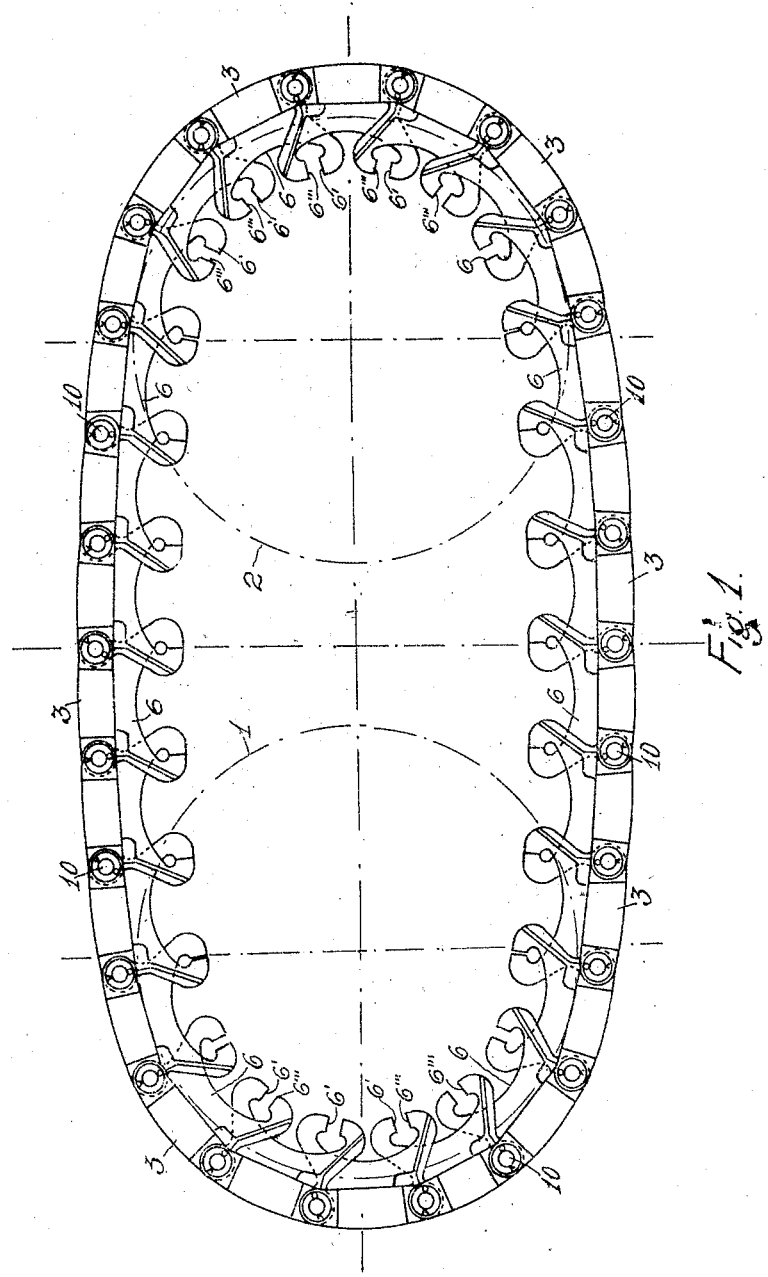

Patented Jan. 5, 1926.

1,568,371

UNITED STATES PATENT OFFICE.

JOSE D. FESTARY, OF SANTIAGO DE CUBA, CUBA.

ENDLESS TRACTION TREAD.

Application filed January 19, 1925. Serial No. 3,517.

*To all whom it may concern:*

Be it known that I, JOSE D. FESTARY, citizen of the Republic of Cuba, residing at Jaguey #2 Street, Santiago de Cuba, Cuba, have invented certain new and useful Improvements in Endless Traction Treads, of which the following is a specification.

This invention relates to endless traction treads, and has for its main object to provide improvements in the links which form the tread. In this invention the link is greatly simplified, eliminating parts which are susceptible to breakage, wear and misplacement and therefore increasing the life of the tread without losing any of its usual essential advantages.

More advantages and other considerations pertaining to this invention will be deduced in the course of this specification, in connection with the figures of the accompanying drawings, wherein:

Fig. 1 is a side elevation of a tread constructed in accordance with this invention.

Fig. 2 is a top plan view, to an enlarged scale, of two of the component links of the tread.

Fig. 3 is a side elevation of one of the tread links.

Figs. 4 and 5 are opposite end elevations of a link.

Fig. 6 is a perspective view of a link.

Fig. 7 is an elevation of an inter-connecting element for the links.

In Figure 1 of the drawing is shown, by dotted lines, two wheels 1 and 2, of one side of a vehicle, (not shown) round which is placed the tread constituted by a plurality of links of an identical construction, and as shown in the drawings.

In the drawing, is shown the link in question, composed of a rectangular plate 3, placed transversely with regards to the longitudinal plane of the wheels 1 and 2, the outer surface of said plate constituting the tread surface of the endless tread, and having its ends rounded as shown at 3'.

From one side of the plate 3, and near each end of the same, projects an ear 4, with a horizontal bore 4' and from the center of the said side and spaced equidistant from the ears 4, projects a wider ear 5, having a horizontal bore 5'.

From the ear 5, and over the inner face of the plate 3, project two ribs 6 which extend parallelly from each side of the ear toward the opposite side of the plate for some distance, then in divergent directions in the shape of a fork, and finally end on the upper sides of horizontal spaced ears 7, each having a horizontal bore 7', such ears 7, projecting from the opposite side of the plate 3, and being spaced a distance approximately equal to the width of the ear 5. The ribs 6 extend beyond each side of the plate 3, expanding upwardly, as shown in Fig. 6.

The closer ends of the ribs 6, are joined together by a bridge 8, and are cut to each form a plane surface or stop 6'. The ribs have their upper parts recessed, as shown at 6" in an irregular arched shape, and the opposite wider spaced ends of the ribs are cut to form stops 6''', which extend slightly inwardly of the ribs. These rib ends have outer extensions 9 which constitute guides for the wheels 1 and 2 of the vehicle.

The links when connected together, have the bores of ears 7 on one side of a plate 3, registering with the bores of the ears 4 and 5 of the opposite side of an adjacent link, said ears 7 being received between the ear 5 and the corresponding ears 4 of the plate. Through the registering bores is mounted a pin 10, as detailed in Fig. 7, which has through its ends, bores 10' to receive a key to hold a washer 12.

In this arrangement the closer ends 6' of the ribs 6, of a link, are received and play between the wider spaced ends 6" of the adjacent link, the stop ends 6' of one of the links coming into alignment with the stop end 6''' of the adjacent link.

When the tread is in position as shown in Fig. 1, the stop ends 6' and 6''' of the links which form the upper and lower parts of the tread, are in engagement thus preventing the pivotal play of one link with another, around the bolt 10 which joins them, and thus said upper and lower parts constitute rigid members without any possibility of pivoting or bending. But as the links move away from the central vertical axial line of the endless tread and continue their movement around the vehicle wheels 1 and 2, said stops become separated one from the other, acting like a scissors. The hinging point is the bolt 10, and the parts of the chain which surround the wheels 1 and 2 remain loose and adjustable, thus avoiding the occurrence of excessive strain between the elements of the chain, and preventing rapid deterioration or breakage of the same. Although the links act frictionally on the wheels, they do not retard the progress of the vehicle.

It is evident that within the principles of construction above described, many modifications may be made without departing from the basic idea of the invention, so I do not wish to limit myself to the construction above described, but I declare that what I claim, is:

1. An endless traction belt link comprising, a tread plate, pivoting lugs on the plate and in the plane of the same for pivotally connecting it to adjacent links in a belt, inwardly projecting spaced ribs on the inner face of the plate, the adjacent end portions of the ribs being parallel, and the spacing between one pair of ends being less than that of the other, and offset lugs on the ends of each rib for cooperating with lugs on adjacent links in a traction belt, the offset lugs at the one ends being parallel, and the offset lugs at the other ends being at right angles, to the planes of the rib portions to which they are respectively attached the lugs at right angles projecting inwardly from the ribs.

2. An endless traction belt link comprising, a tread plate, pivoting lugs in the plane of, and on, the plate and pivotally connecting it to adjacent links in a belt, inwardly projecting spaced ribs on the inner face of the plate, the adjacent end portions of the ribs being parallel, and the spacing between one pair of ends being less than that of the other, and offset lugs on the ends of each rib for cooperating with lugs on adjacent links in a traction belt, the offset lugs at the one ends being parallel, and the offset lugs at the other ends being at right angles and inwardly projecting relatively to the planes of the rib portions to which they are respectively attached, the lugs parallel to their rib portions being on the ends which are less widely spaced from each other.

In testimony whereof I have signed my name to this specification.

JOSE D. FESTARY.